W. S. NORTON.
COUNTING APPARATUS.
APPLICATION FILED MAY 16, 1917.

1,284,430.

Patented Nov. 12, 1918.
7 SHEETS—SHEET 1.

W. S. NORTON.
COUNTING APPARATUS.
APPLICATION FILED MAY 16, 1917.
1,284,430.
Patented Nov. 12, 1918.
7 SHEETS—SHEET 2.
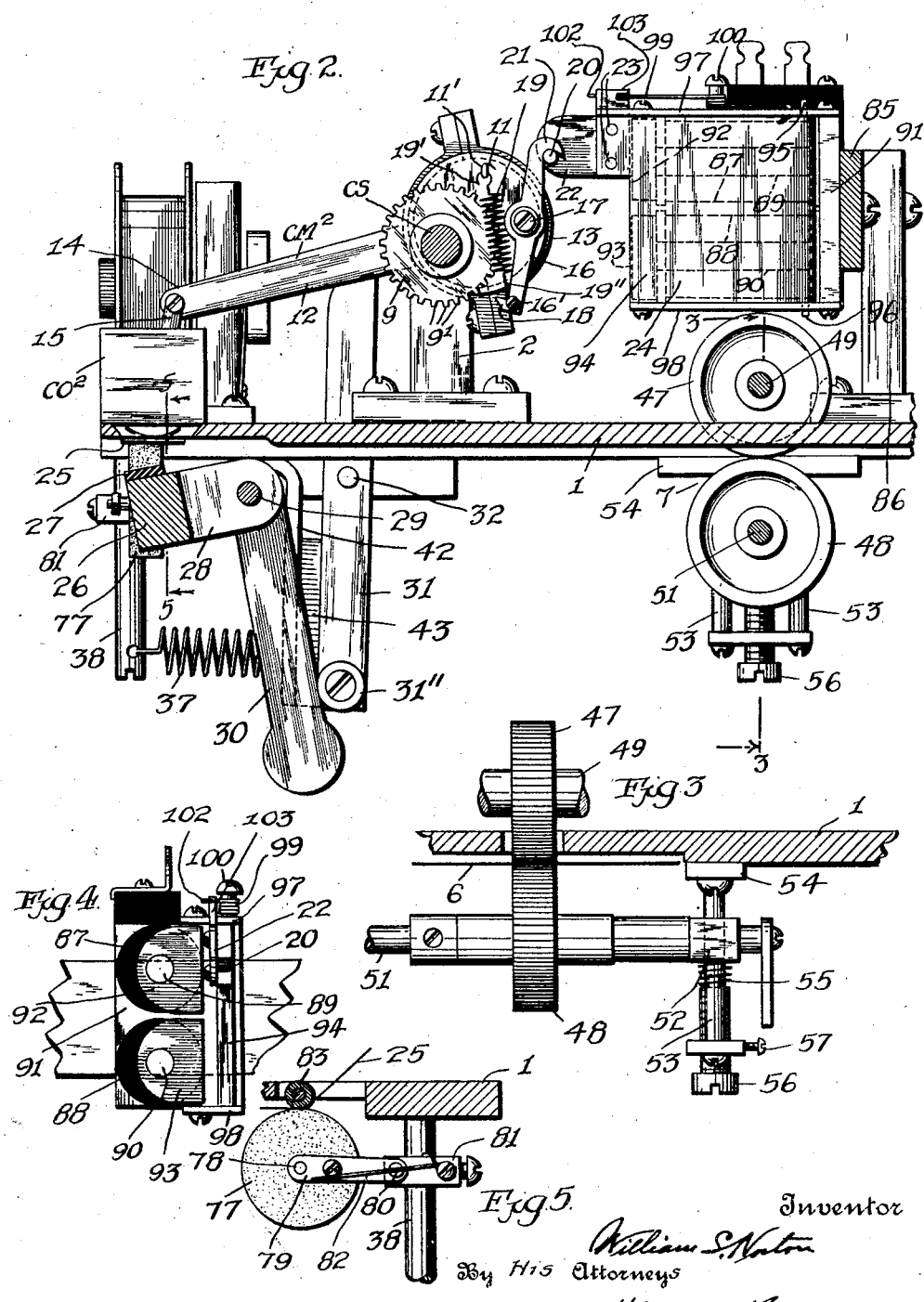
Inventor
William S. Norton
By His Attorneys
Kiddle & Margun

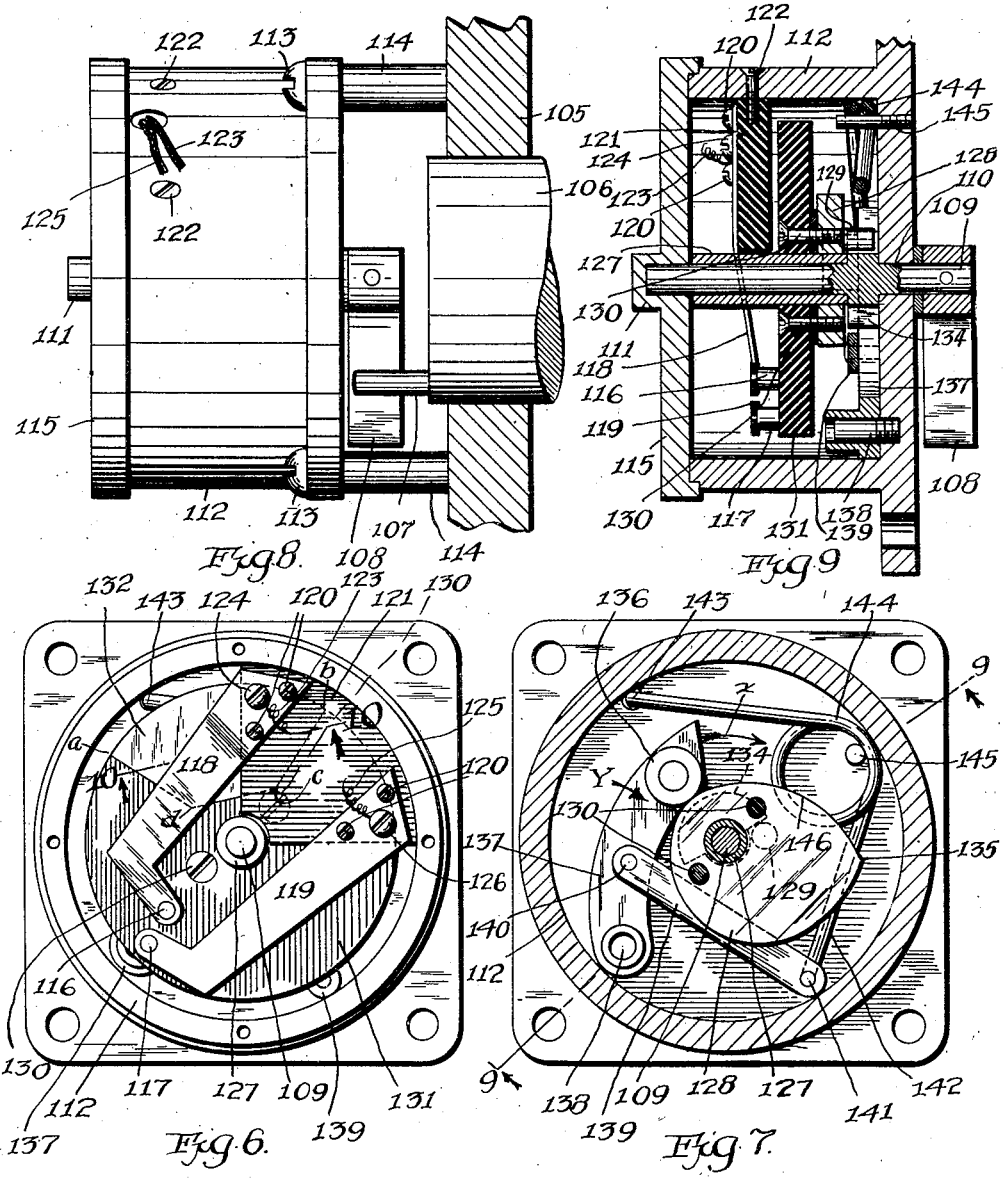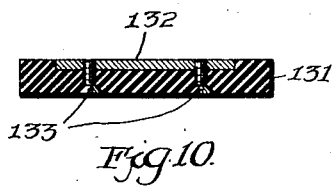

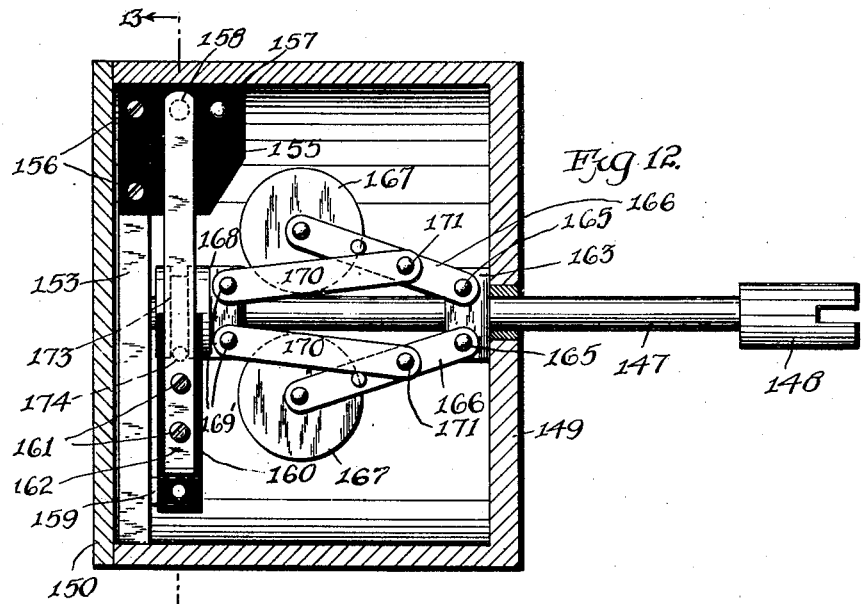
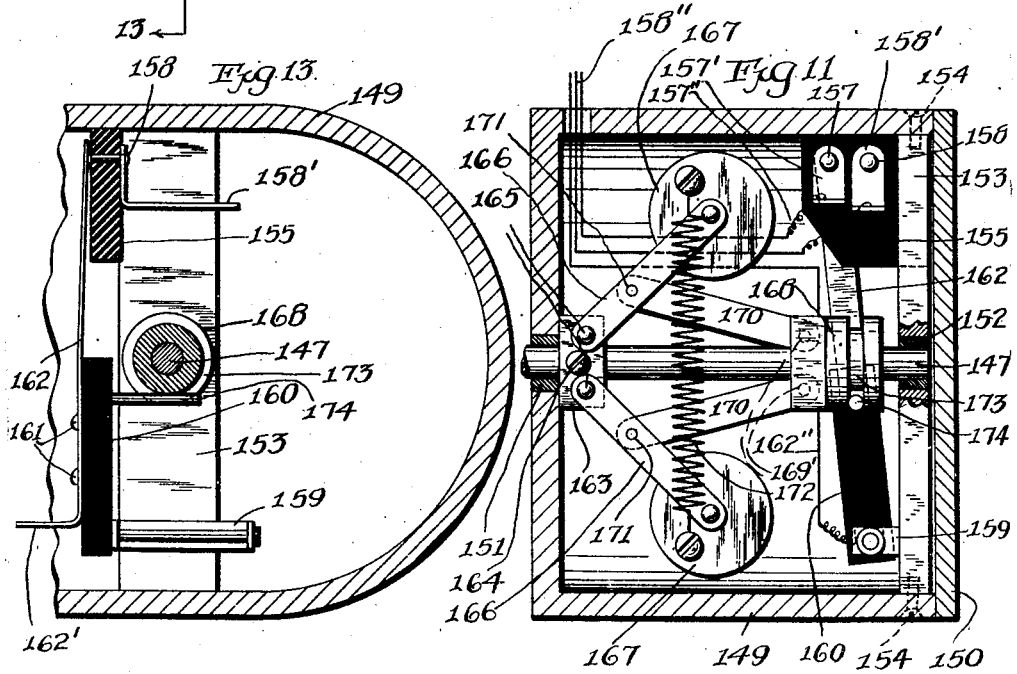

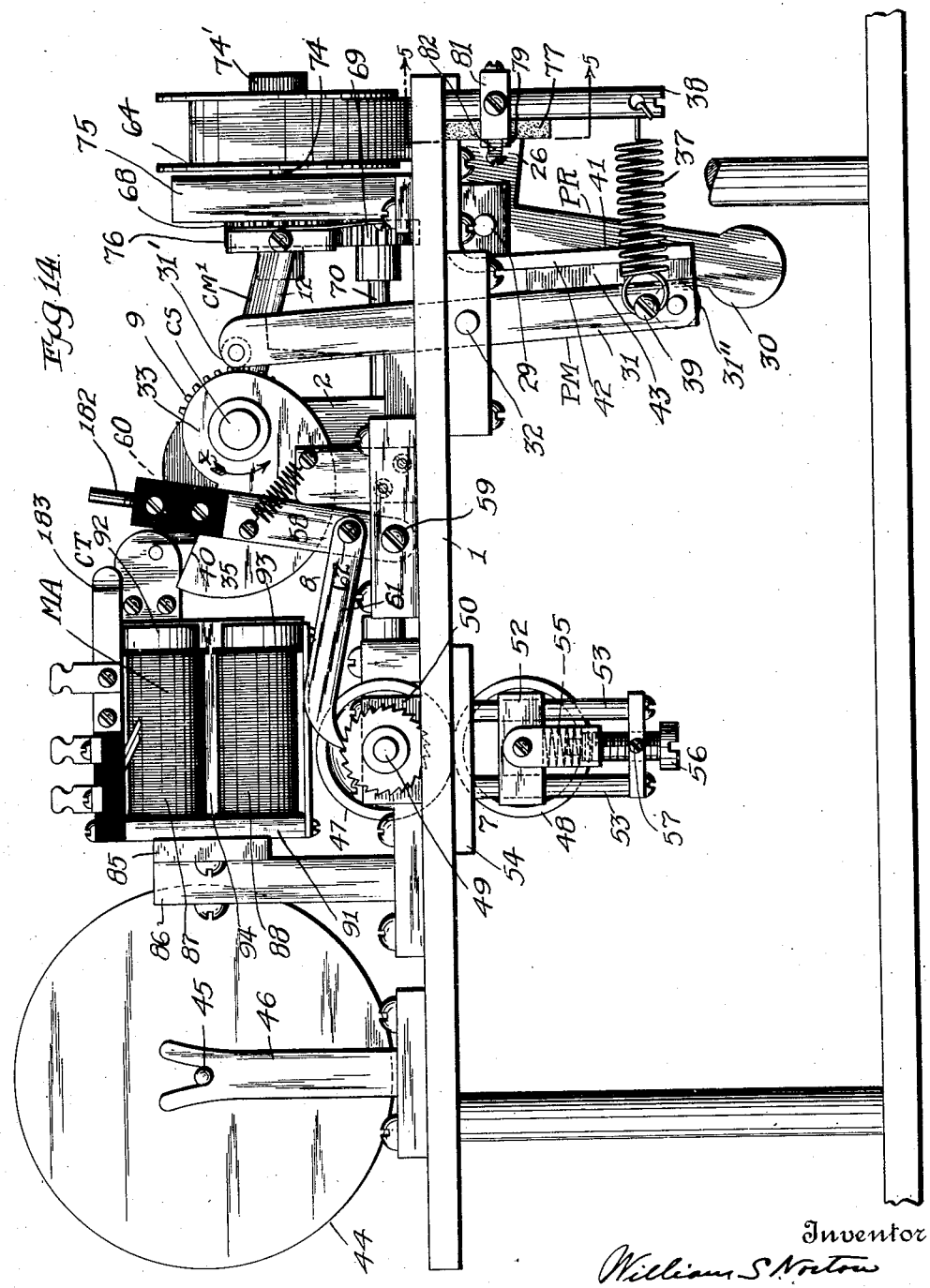

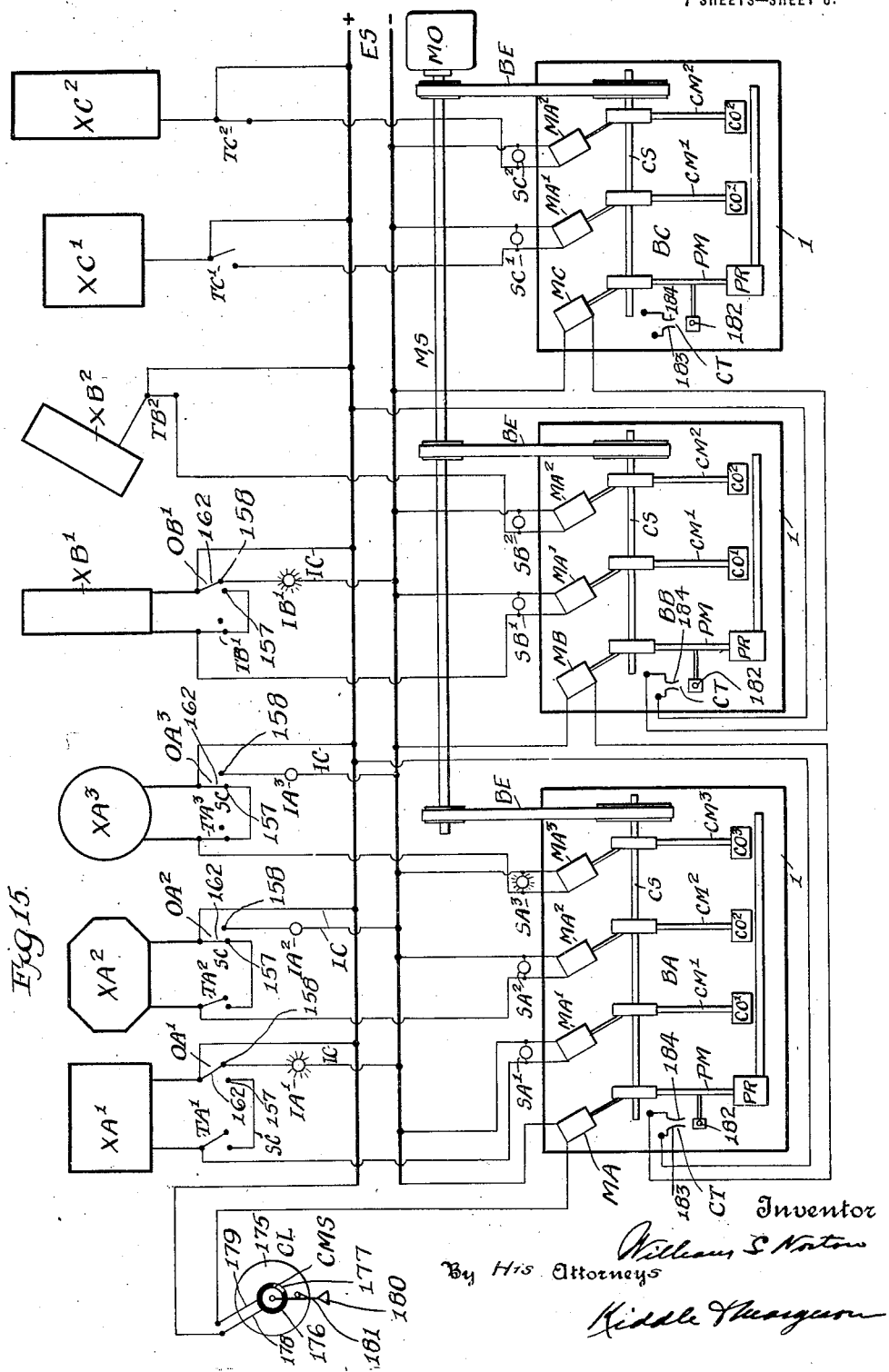

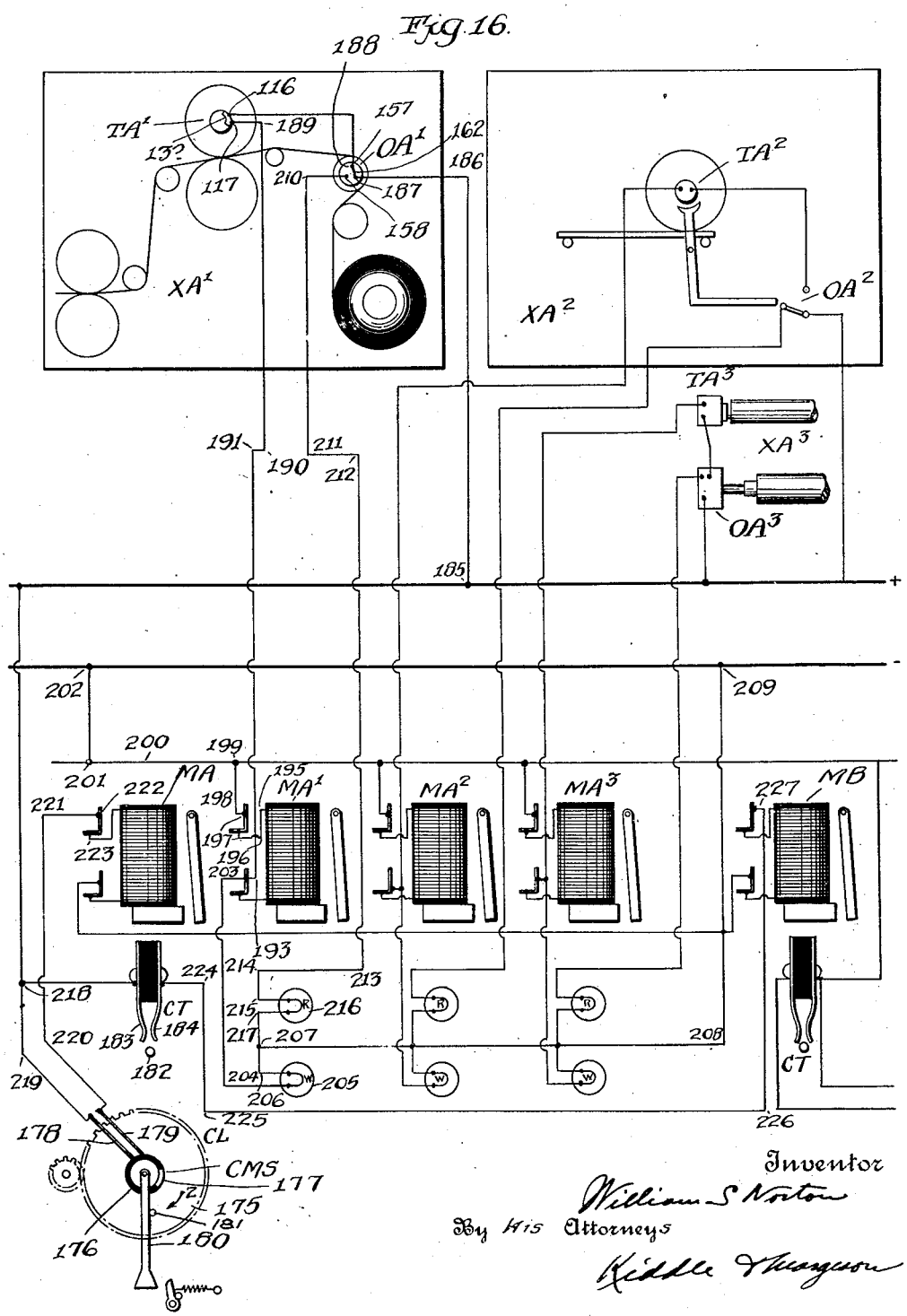

UNITED STATES PATENT OFFICE.

WILLIAM S. NORTON, OF NEW YORK, N. Y.

COUNTING APPARATUS.

1,284,430.   Specification of Letters Patent.   Patented Nov. 12, 1918.

Application filed May 16, 1917. Serial No. 168,938.

*To all whom it may concern:*

Be it known that I, WILLIAM S. NORTON, a citizen of the United States, and a resident of the borough of Manhattan, in the city of New York, county and State of New York, have invented certain new and useful Improvements in Counting Apparatus, of which the following is a specification.

The object of the invention is to construct an apparatus, instrument or system whereby the output of a machine can be recorded at any predetermined period.

In several businesses many machines of the same type such as, by way of example, a battery of printing presses, are located in places isolated from or at least some distance from the main office and because of the large number of machines, and also to a certain extent because of the size of said machines, it is often very difficult for the superintendent or other person in charge to know with any certain degree of accuracy whether or not any machine was or is doing its proper amount of work at any particular time.

According to the present invention a recording apparatus or instrument is suitably connected to some movable member of the machine in synchronism with the output of the machine so that the total number of movements of that certain machine part will be recorded in order to permit the total output of the machine to be readily ascertained for any predetermined period or at any time.

The apparatus, in a preferred form, comprises transmitting contacts—sometimes referred to as momentary contacts,—counters or counting devices with means for actuating the same, a magnet corresponding to each transmitting contact and in circuit therewith for controlling the operation of a counter by its corresponding means, printing mechanism for printing at a predetermined period the reading of the counters thereby ascertaining the total output of each machine, a clock or time element that controls the operation of the printing mechanism, a web or strip of paper upon which the total of each counter is recorded, and feeding means for moving said strip of paper.

The printing mechanism is provided with a typewriter ribbon or printing ribbon and means for moving and inking the same whereby the printing upon the paper is enabled to be realized.

In this preferred form of apparatus there is also provided an automatic switch—sometimes referred to herein as the output switch—which disconnects or disrupts the circuit in which the transmitting contact is included when the machine with which the automatic or output switch is associated is in operation but without any output. In other words, the automatic or output switch disrupts the circuit that includes the magnet which corresponds to a transmitting contact that is associated with the same machine with which the automatic or output switch is associated.

One type of signaling means—a white light for example—is provided to indicate when the machine is in operation with an output, and another type of signaling means—a red light for example—is provided so as to indicate when the machine is in operation without an output. This last-mentioned signaling means, to wit, the red light, is rendered effective or is lighted when the machine is not in operation.

As showing a specific embodiment of the invention reference is made to the drawings forming a part of this specification and in which drawings, Figure 1 is a plan view illustrating a plurality of counting devices comprising individual counters assembled in operative relationship with a common driving shaft in such a manner that each counter is actuated independent of the other, irrespective as to the different speeds of the several machines of which they are to record the output or speed. Each of these counters is actuated from said driving shaft through any suitable counting-operating mechanism, as through the medium of a link, an eccentric and a gear and pawl shown in said figure. In this figure there are also indicated the method of printing upon a web or strip of paper and the moving of the strip of paper from the shaft which actuates the counters. There is also connected to this shaft means for moving a typewriter ribbon which is used for printing purposes.

Fig. 2 is a vertical view, as indicated by the line 2—2 of Fig. 1 looking in the direction of the arrows. In said Fig. 2 there are illustrated the counting-operating mechanism above referred to and an electric magnet which controls the actuation of said counting-operating mechanism by the shaft.

Fig. 3 shows the feeding means for shifting the web or strip of paper. This figure is a vertical view taken as on the plane indicated by the line 3—3 in Fig. 2 looking in the direction of the arrows.

Fig. 4 is a front view of a magnet showing the armature of the magnet in normal position and a spring for resetting or restoring the armature to normal position after having been moved therefrom by the energizing of the magnet.

Figure 1:
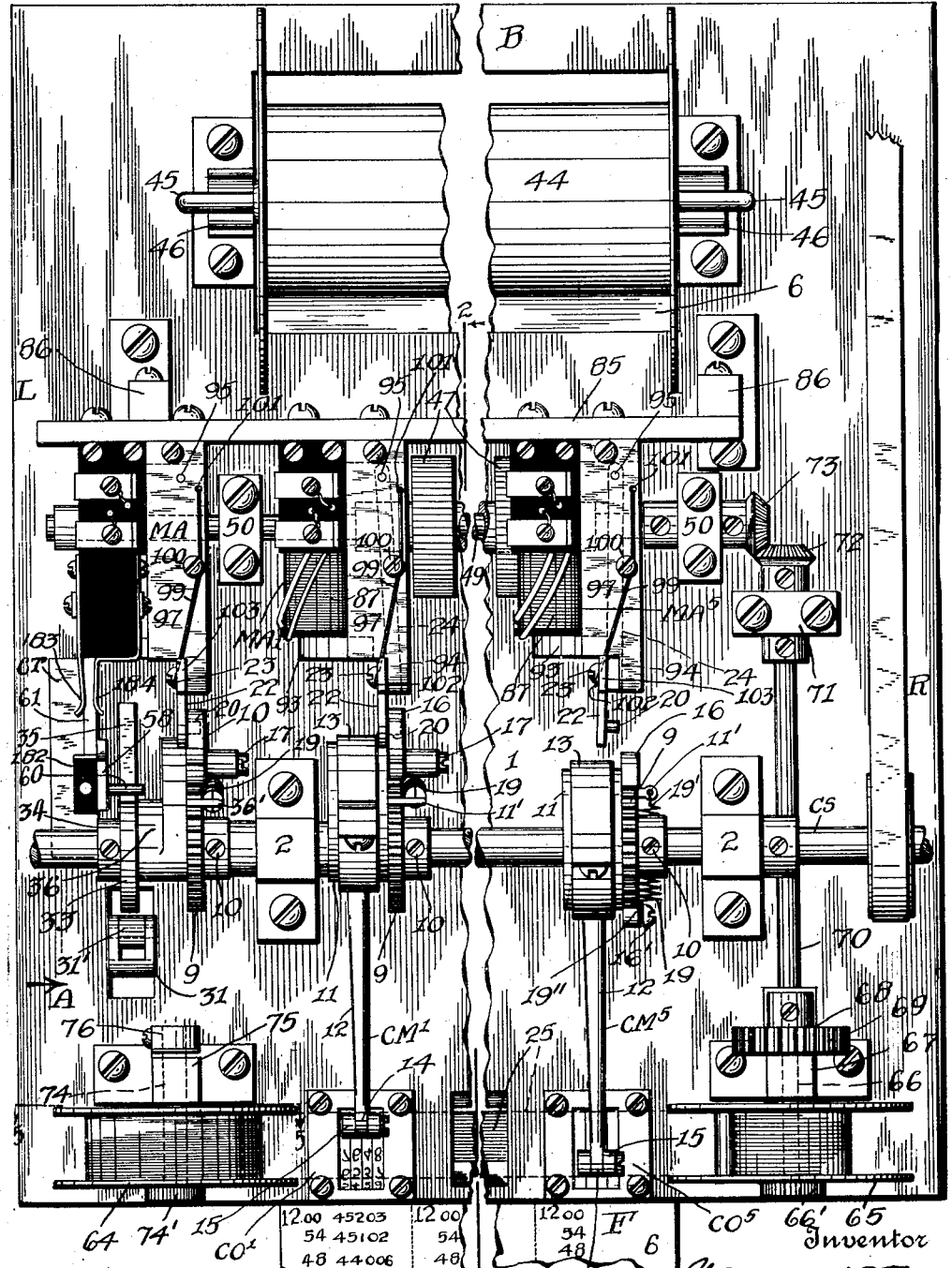

Fig. 5 shows a portion of a printing ribbon and mechanism for inking or reinking the printing ribbon by a felt-wheel acting as an inking roller. The felt-wheel is saturated with ink and the ribbon passes in engagement with the inked wheel. This is a view taken as on the line 5—5 in Figs. 1 and 2.

Fig. 6 is an end view of an assembled transmitting contact or transmitting switch as it may be called. In this view the cover of the switch casing has been removed.

Fig. 7 shows the transmitting contact or switch with the movable contact member that is illustrated in Fig. 10 removed, whereby there can be seen a cam of the contact and means for actuating said cam.

Fig. 8 shows an assembled transmitting contact or switch and in this figure there is illustrated the manner of attaching the switch to the machine. In this figure there is also shown the end of a shaft of the machine on which shaft a pin is carried that turns or propels at each revolution a projecting revoluble member of the contact or switch.

Fig. 9 is a sectional view of a complete contact or switch and is a view taken as along the line 9—9 of Fig. 7 looking in the direction of the arrows.

Fig. 10 illustrates a section of a disk or contact member of the transmitting contact or switch, and is a view taken as along the line 10—10 in Fig. 6 looking in the direction of the arrows. This contact member comprises a disk of insulating material into which there is molded or inserted a metallic contact.

Fig. 11 illustrates—partially in section—a centrifugal switch for use in conjunction with the transmitting contact. This centrifugal switch serves as the automatic switch or output switch previously referred to and disconnects the transmitting contact or switch when the machine with which the automatic switch is associated is in operation but with no output. The members of the automatic or output switch occupy the position shown in this figure when the switch is closed and an output is being delivered.

Fig. 12 illustrates the centrifugal or automatic switch in the position which the members occupy when the switch is inoperative; that is when there is no output from the machine.

Fig. 13 is a partial sectional view of the centrifugal or automatic switch and is a view taken as along the line 13—13 of Fig. 12 looking in the direction of the arrows.

Fig. 14 is an elevation of the construction shown in Fig. 1 and is a view looking in the direction of arrow A in Fig. 1. In Fig. 14 some of the parts have been broken away so as to show more clearly the other parts. There is particularly illustrated in this figure the printing mechanism that is actuated by the common driving shaft and the feeding means for shifting the paper, which feeding means is actuated by said common driving shaft.

Fig. 15 is a diagrammatic view of an installation or apparatus wherein several banks of counters are employed for a number of machines. In this view there are illustrated a printing mechanism associated with each bank of counters and a clock for causing a printing of the reading of the several counters at a predetermined period.

Fig. 16 is a wiring diagram and illustrates, for example the method of connecting the electrical elements of the device or apparatus.

It is believed the operation of the apparatus, instrument, system, installation or device as a whole no matter by what name the same is called will be more fully and more readily appreciated after an understanding of the construction and mode of operation of each component part, device or mechanism employed in or constituting a part of said apparatus, instrument, system, installation or device and therefore a detailed description of each of said parts, devices or mechanisms immediately follows and precedes the description of the diagrammatic view and of the wiring diagram shown particularly in Figs. 15 and 16 which diagrammatic view and wiring diagram have been used as a means to exemplify the arrangement and operation of the several parts entering into the complete apparatus or installation.

Like or equivalent parts have been given the same reference characters throughout the specification and on the drawings, but in some figures of the drawings these parts are shown in full while in other figures they have been illustrated merely diagrammatically.

In Figs. 1, 2 and 14 there is shown what may be broadly considered as a combined counting and printing mechanism or device mounted on a main frame or common support 1. These are assembly views.

In order that certain expressions herein employed will be definite and clear, in reference to the different parts shown in the mechanism or device illustrated in Fig. 1, the part designated F is to be considered the front, B the back, R the right-hand side or end and L the left-hand side or end. A line parallel to the front of the mechanism is to be considered as extending longitudinally and a line such as 2—2 is to be considered as extending transversely.

The combined counting and printing mechanism is preferably constructed so as to comprise a bank of counters having associated therewith a single printing mechanism; in other words, there may be, for example, a bank of five counters with a single printing mechanism. Such a bank of counters is illustrated in Fig. 1. For each bank of counters there is a main frame or common support 1 carrying bearings 2 in which there is revolubly mounted a common driving shaft CS. This common driving shaft CS is continuously rotated, as will hereinafter appear, and may be considered as a part of a common source of mechanical power. The several counters for counting the output of the machine with which they are respectively associated are designated as $CO^1$ to $CO^5$. As the construction of a counting mechanism is old and well known further description of the counters $CO^1$, etc., is deemed unnecessary. For each counter and associated with each counter and common driving shaft CS there is a counter or counting-operating mechanism $CM^1$ or $CM^2$ which is normally functionally inoperative, except at such times as it is caused to be brought into operation for the purpose of recording an output from the machine with which its particular counter is associated. The counter operating mechanism is actuated so as to perform the counting operation from the common driving shaft CS.

The printing mechanism is designated by PR and is operated from the shaft CS by the printing mechanism operating means PM. The printing of the reading of the counters for the several machines is recorded upon a web or strip of paper 6 that is shifted for each printing operation by the feeding mechanism 7. The feeding mechanism is actuated from the common driving shaft CS through the medium of feeding mechanism operating means 8. Broadly considered, each counter and its operating mechanism is a counting mechanism actuated from the common shaft. Each printing mechanism PR and its printing mechanism operating means PM is a printing mechanism actuated from the common shaft, and each feeding mechanism 7 and its feeding mechanism operating means 8 is a feeding mechanism operated from the common shaft. The feeding mechanism may in fact be considered a part of the printing mechanism since it is an important element necessary to shift the paper upon which the printing record is to be taken, if the feeding of the paper is to be done automatically. This feeding mechanism, as will hereinafter appear, also causes a shifting of the typewriter ribbon employed in the printing operation.

*Counting mechanism.*

As previously indicated, each counting mechanism is actuated from the common driving shaft CS and the specific counter or counting-operating mechanism shown comprises a spur-gear 9 that is fixedly secured to the shaft CS, as by a screw 10. An eccentric 11 is associated with this gear. This eccentric normally remains in the position shown in Figs. 1 and 2, this being the position of the eccentric when the counting operating mechanism $CM^1$ or $CM^2$, as the case may be, is functionally inoperative. While the eccentric 11 remains in this normal inoperative position the shaft CS revolves relatively thereto. A connecting link 12 is held in place on the eccentric by a strap 13 and one end 14 of the link is connected to a lever 15 of a counter. A pawl or catch 16 is pivotally mounted at 17 upon the eccentric 11 and is arranged so that the end or catch member 18 can engage the teeth 9' of the spur-gear 9 when the pawl is released, whereby the gear 9 through the medium of the pawl 16 will cause the eccentric 11 to move with the gear and thus actuate a counter. When the pawl is released in a manner as will hereinafter appear a spring 19 causes the end or catch member 18 to move whereby the engagement of the pawl with the gear will take place, one end 19' of this spring 19 being connected to an eye 11' on the eccentric 11 and the other end 19" being connected to a screw 16' on the pawl or catch 16. The pawl 16 is normally held in the position shown in Fig. 2 by a pin 20 which is engaged by a hook portion 21 at the upper end of the pawl 16. The pin 20 is carried on a plate 22 which is connected by screws 23 to an armature 24 of an electro-magnet $MA^1$, $MA^2$, $MA^3$, $MA^4$, or $MA^5$ as the case may be. In the magnet $MA^1$ shown in Fig. 1 the parts are in the position which they occupy when the counting-operating mechanism corresponding thereto is functionally inoperative, while the parts of the magnet $MA^5$ in this figure are shown in the position which they occupy when the counting operating mechanism corresponding thereto is being moved by the shaft to perform a counting operation. In other words, the pin 20 of magnet $MA^1$ is shown in the position which it occupies when the pawl 16 is being held, whereas the pin 20 of magnet $MA^5$ is shown in the position which it occupies when the pawl 16 is not held, that is, when the pawl has been released. When the pawl has been released by withdrawing the pin 20 from the position where the pawl 16 will engage it then the spring 19 draws the end or catch 18 of the pawl into engagement with the teeth 9' of the spur-gear 9 so that as the common driving shaft CS having the gear 9 secured thereto revolves it will necessarily carry with it the eccentric 11 and pawl 16 thereupon because of the engagement of the pawl with the gear.

It will here be noted that each magnet MA¹, MA² etc., constitutes a part of an electric means for controlling the locking to the shaft CS of the counting-operating mechanism to which the particular magnet corresponds. This magnet is controlled by a switch, to wit, the transmitting contact or switch or momentary contact which is constructed so that the magnet will be deenergized whereby the armature of the magnet can be restored to its normal position before the driving shaft CS has made a complete revolution, and a spring is provided for each magnet to cause the restoration of the armature to its normal position immediately upon the deënergizing of the magnet. As the eccentric 11 approaches the end of the revolution and its normal position the hook portion 21 of the pawl 16 engages the pin 20 and this automatically effects a disengagement of the end or catch 18 of the pawl 16 from the teeth 9' of the spur-gear 9. It will therefore be seen that each time a magnet MA¹, MA², etc., as the case may be, is energized it allows the counting-operating mechanism associated therewith to be operatively connected to and driven by the common driving shaft CS whereby the counter will be actuated once and thereafter when the magnet is deënergized it causes the counting-operating mechanism to be disconnected from the shaft.

The construction of the magnet just referred to will subsequently be described more in detail and the same remarks apply in regard to the transmitting contact or switch.

*Printing mechanism.*

The function of the printing mechanism is to record upon the web or strip of paper the readings of the several counters in the bank of counters. This is accomplished by the figures upon the wheels of the several counters being preferably raised figures and between them and the paper there is located the printing ribbon or typewriter ribbon 25. As the web or strip of paper is marked with the time of the day and as it is also moved or fed intermittently, but at a uniform distance for a unit of time, it is possible to record the reading of the counters for each particular interval desired, provided the printing mechanism is actuated at such times. The printing mechanism proper may be considered to comprise the printing mechanism PR and the printing mechanism operating means PM. The mechanism PR includes a longitudinally extending bar 26 having a padded surface 27 thereupon which can be moved so as to force the web or strip of paper upwardly against the inked surface of the typewriter ribbon that has behind it the raised figures of the several counters and this operation prints the reading of each counter as it stands at that time. The longitudinally extending bar 26 is mounted upon or is a part of pivoted arms 28 of a bell-crank lever construction that swings upon bearings 29 upon the main frame or common support 1. The bell-crank lever construction also comprises a depending arm, or arms 30. The printing mechanism operating means PM comprises a lever 31 which is pivotally mounted at 32 upon a bearing on the frame, a cam member 33 which is shown in its normal position in Fig. 14—this being the position which it occupies when the printing mechanism operating means is functionally inoperative—a spur-gear 9 and a pawl 16. This gear and pawl are the same in construction and operation as the gear and pawl of the counting-operating mechanism and these elements have been heretofore clearly described. The cam member 33 is maintained in place on the shaft between the spur-gear 9—the latter of which is secured to the shaft CS—and a collar 34 that is also secured to the shaft CS. The cam member 33 preferably comprises a steel plate 35 which provides the cam or wearing surface and this steel plate 35 is secured to a body member 36 so that the parts 35 and 36 constitute in effect a single member. The pawl 16 is carried upon the member 36 and one end of the spring 19 that tends to pull the pawl into engagement with the spur-gear 9 is connected to a member 36' on the member 36. A magnet MA which is substantially the same as magnets MA¹, MA², etc., is employed and this magnet has associated therewith an armature which carries the pin 20 for holding the pawl 16 in a position in which the printing mechanism operating means PM will be caused to remain functionally inoperative. As soon as the magnet is energized the pin 20 releases the pawl and allows the pawl to engage the spur-gear 9 whereby the shaft CS will impart a turning of the cam. Only one revolution will be imparted to the cam. Before the completion of the revolution the magnet is deënergized whereby a spring can instantly restore the armature of the magnet to its normal position. The shaft CS rotates in the direction of the arrow $x$ and an inspection of Fig. 14 will make it clear that when the cam member 33 engages the anti-friction roller 31' at the upper end of the lever 31 it forces the upper end of the lever forwardly and the lower end rearwardly against the tension of a comparatively powerful spring 37, one end of which spring is connected to a depending member 38 on the main frame 1 and the other end of which spring is connected by screw 39 to the lower end of the lever 31. When the cam member disengages the upper end of the lever, as by a drop portion 40 of the cam moving past that part of the lever, the lever is free to be moved to its normal position and it is moved instantly toward this position by the pull of the tension spring 37. As the lower end of the lever is moved toward its normal forward position an anti-friction roller 31" thereupon engages the rear side of the lower free end of the bell-crank lever of the printing mechanism PR and imparts to the lower end of said lever a quick—practically instantaneous—forward movement thus imparting by the longitudinally extending bar 26 a hammer-like blow against the under side of the paper and the counters, the latter of which ultimately receive the blow, whereby the printing operation is effected. The weight of the longitudinally extending bar 26 is sufficient to cause the bell-crank lever construction and parts carried thereby to swing about the pivotal support or bearing 29 whereby the lower end of the bell-crank lever will follow and remain in engagement with the anti-friction roller 31" as the lower end of the lever 31 is moved rearwardly by the cam. The forward movement of the lower end of the lever 31 is arrested before the printing operation takes place by a yielding bumper construction 41 which comprises a bracket 42 upon which there is a yielding rubber pad 43 with which the lever 31 normally engages. The lever 31 and the printing mechanism are shown in the position which they normally occupy; that is in their inoperative positions, in both Figs. 2 and 14. It will here be noted that the depending arm, or arms, 30 of the bell-crank lever construction is located longitudinally at one side of the bumper construction 41 and that the anti-friction roller 31" extends from one side of the lever 31 so as to normally engage said arm or arms. There is a period in the printing operation when the bell-crank lever construction and the parts carried thereby leave this roller 31" due to the momentum which they acquired during the first portion of the period when the spring 37 pulled the lower end of the lever from its abnormal rearward position to its normal forward position.

*Paper feed and printing ribbon feed.*

A web or strip of paper is carried on the spool 44 that is mounted on spindles or shafts 45 which are carried in bearings 46 on the main frame 1. The feed of the paper from the source of supply to the counters is through the medium of the feeding mechanism and the feeding mechanism operating means previously referred to. The feeding mechanism 7 and the feeding mechanism operating means 8 may, as previously indicated, be considered as a feeding mechanism that is associated with or constitutes a part of the printing mechanism since they are important features correlated with the printing mechanism for making a preferred form of machine or device. This feeding mechanism is best illustrated in Figs. 1, 2, 3 and 14. The web or strip of paper passes from the spool 44 between sets of feeding rollers 47 and 48 through the space between the typewriter ribbon 25 and pad 27 of the printing bar 26. These rollers are preferably made of metal and their peripheries are provided with fine serrations or teeth whereby the paper will be fed without slipping as the rollers rotate. The upper set of rollers 47 is mounted on a shaft 49 that is carried in bearings 50 which are on the main frame and these rollers extend downwardly through openings in the main frame. The lower set of rollers 48 is carried on a shaft 51 which is mounted in yieldable bearings 52. These yieldable bearings 52 slide upon depending arms or guideways 53 of bearing members 54 which are carried upon the main frame 1. The yieldable bearings 52 are normally spring pressed upwardly by a compression spring 55 the compression of which is adjustable by a screw abutment member 56. These screws 56 can be located in place as by a set-screw 57. The shaft 49 carrying the rollers of the upper set is a driven shaft whereas the rollers of the lower set merely turn due to engagement with the paper which the upper rollers feed. In order that the feed may take place at predetermined intervals the feeding mechanism operating means 8 has been provided. This means comprises a lever 58 which is pivotally mounted at 59 upon a bearing carried by the frame 1 and the upper end of this lever 58 has a pin 60 (see Figs. 1 and 14) which is arranged so as to extend into the path of movement of the cam member 33 that actuates the lever of the printing mechanism operating means PM; in other words, this cam 33 may be considered a member which is common to the printing mechanism operating means PM as well as to the feeding mechanism operating means 8. A pawl 61 is pivotally mounted at 62 upon the lever 58 and the free end of this pawl engages a ratchet-wheel or saw-tooth wheel which is secured to the shaft 49. It will therefore be noted that each time the cam 33 makes a complete revolution it operates not only the printing mechanism but also the mechanism for feeding the paper to the printing mechanism. The construction is such, however, that the feed of the paper does not take place until after the printing on the paper has been actually performed. As a matter of fact the cam 33 is constructed so that the printing operation is completely effected before the cam engages the pin 60 to move the upper end of the lever 58 rearwardly whereby the pawl and ratchet construction turn the feeding rollers the desired amount. The upper end of this lever carries an insulated contact member 182 which coöperates with stationary contacts 183 and 184 so as to close a switch CT the construction and function of which will be subsequently described in connection with the description of Figs. 15 and 16. The typewriter ribbon 25 is carried on spools or magazines 64 and 65 and one of these spools, to wit, spool 64 may be considered as the supply spool, whereas spool 65 may be considered as the receiving spool. The receiving spool 65 is secured to a shaft 66 by a nut 66'. This shaft is mounted in a bearing 67 on the main frame 1 and to this shaft there is also secured a spur-gear 68 which is in mesh with a spur-gear 69 that is directly below the gear 68. The gear 69 is mounted on a shaft 70 the rear end of which shaft is mounted in a bearing 71 on the main frame and the forward end of which shaft finds a seat in the bearing 67. A bevel-gear 72 is secured to the shaft 70 and there is in mesh with this gear another bevel-gear 73 which is secured to the shaft 49 of the upper set of feeding rollers. It will therefore be seen that each time a feeding movement is imparted to the feeding rollers 47 there will also be a corresponding feed of the printing ribbon 25 due to the turning of the receiving spool or magazine 65. The supply spool or magazine 64 is secured to a shaft 74 by a nut 74'. This shaft is mounted in a bearing 75 on the frame 1. To the rear end of this shaft 74 there is secured a thumb member 76 that can be employed to turn or hold the shaft.

A construction whereby the printing ribbon 25 can be inked as it is used is shown in Fig. 5 and this inking construction comprises an inking roller 77 carried on a shaft 78 that is mounted at the free end of a bearing member 79 that is pivotally mounted at 80 upon a member 81. The member 81 is clamped to the depending member 38 that is on the main frame 1. This inking roller 77 is normally spring-pressed upwardly against the under side of the inking ribbon 25 by a spring 82. The inking roller 77 is preferably made of felt and can be saturated with ink so that the ink will be transmitted to the ribbon as the ribbon moves along in engagement with the roller 77 which is pressed against the ribbon with more or less force. A resisting roller 83 maintains the ribbon 25 in proper position while being inked. As the paper feeding means constitutes a construction which becomes instrumental in feeding the printing ribbon that is employed in the printing operation it is still further apparent why the paper feeding mechanism may be properly considered as a part of the printing mechanism with which it is more or less intimately associated.

Magnets $MA$, $MA^1$, $MA^2$, etc.

These several magnets are carried on a common supporting bar 85 that extends longitudinally and this bar 85 is carried by and is secured to members 86 which members are in turn secured to the main frame 1. Each magnet comprises magnet coils or solenoids 87 and 88 (see particularly Fig. 4) and iron cores therefor 89 and 90, which cores extend forwardly from the upright end bar or cross bar 91 that is secured to the common supporting bar 85. At the forward end of each of these cores there is secured a horseshoe member, as 92 and 93, which horseshoe members provide the terminals of the magnet when the magnet coils are energized. The armature of each magnet is designated as 94 and it is pivotally mounted at 95 and 96 upon forwardly extending carrying members 97 and 98 (see Figs. 1 and 2) which carrying members are preferably secured at their rear ends to the upper and lower ends respectively of the upright end bar or cross bar 91. The forward end of the carrying member 97 is secured to or has secured to it the upper horseshoe terminal member 92 and the forward end of the lower carrying member 98 is secured to or has secured to it the lower horseshoe terminal member 93. These carrying members 97 and 98 are of magnetically-nonconducting material, as brass, while the armature is of suitable magnetically-conducting material, as steel, that will be attracted to the left toward the horseshoe shaped terminals when the magnet is energized. When the magnet is deënergized the armature is immediately swung to the right by a spring 99 which is held in place on the upper carrying member 97 by a screw or pin 100. One end of this spring passes through a hole 101 in the upper carrying member and the forward end 102 of the spring presses against an upward brass extension 103 that is secured to the armature 94. A forward brass extension 22 which is preferably integral with the extension 103 is also carried by the armature 94 and at the forward end of said extension 22 there is supported the pin 20 previously referred to.

The construction above described applies to the magnet MA that controls the operation of the printing mechanism and to the magnets $MA^1$, $MA^2$, $MA^3$, $MA^4$ and $MA^5$ which control the operation of the counting mechanism. Each time a magnet is energized it overcomes the force of the small spring 99 just described and moves the armature to the left a sufficient distance to cause the pin 20 to disengage the hook portion 21 of the pawl 16 corresponding to the magnet, thus allowing the mechanism, be it the printing mechanism or the counting mechanism associated with that particular magnet, to be operated from the common driving shaft CS. It will hereinafter appear that the construction is such as to cause the supply of current to each magnet to be disrupted before the shaft CS makes a complete revolution. The spring 99 can restore the armature to its normal position so that the pawl will engage the pin 20 and render the mechanism associated with the magnet inoperative.

*Transmitting or momentary contact.*

The transmitting or momentary contact or switch is illustrated in Figs. 6 to 10 inclusive. In Fig. 8 a part of the machine with which the transmitting contact is associated is designated by 105 and a revolving shaft of the machine is designated by 106. The shaft which is selected is one which moves in synchronism with the operating element of the machine; in other words, one which moves in synchronism with the operating element of the machine as a regular normal output is being delivered therefrom. This shaft 106 is provided with a driving pin 107 that engages a crank or arm 108 that is on and secured to a shaft 109 whereby as the shaft 106 rotates the shaft 109 will be rotated. The shaft 109 is mounted in bearings 110 and 111 of the switch casing. The bearing 110 is located in a body member 112 of the casing which body member is secured in any suitable manner, as by screws 113 and spacing members 114, to the member 105 of the machine. The bearing 111 is mounted in a cap or cover 115 which constitutes a particular casing. This cover 115 may be secured in place on the main body of the casing in any suitable manner whereby the switch cannot be tampered with. The switch member comprises stationary contacts 116 and 117 that are carried at the ends of spring members 118, 119, respectively, of conducting material. These spring members are secured in place by means of screws 120, 120 to a block of insulating material 121 that is in turn secured to the body member 112 of the casing by screws 122. A leading-in wire 123 is connected to the spring contact carrier 118, as by a screw 124, while a leading-out wire 125 is connected to the spring contact carrier 119, as by a screw 126. A hollow shaft 127 is revolubly mounted upon the shaft 109 and to this hollow shaft 127 there is secured a cam 128 which carries at the rear side thereof a pin 129 by which the cam is driven during a portion of its movement. To this cam there is secured, by screws 130, a movable contact carrier 131 of insulating material and in this contact carrier of insulating material there is inserted a piece or member of conducting material 132 held in place by screws 133. This member 132 is a contact member and is delineated in Fig. 6 by the curved line *a—b* and straight lines *b—c*, *c—d* and *d—a*. The member 131 of insulating material and the member 132 of electrical conducting material constitute what may be referred to as the movable contact member of the switch. The member 131 is circular in shape and the surface of the metallic contact 132 is flush with the surface of the insulating material of member 131. The stationary contacts 116 and 117 are always spring pressed so as to engage either the insulated portion of the member 131 or the conducting member 132. It will, however, be seen that the switch construction is such as to prevent the member 132 remaining in engagement with the stationary contacts 116 and 117 for more than a moment or an instant under any condition, due to the cam construction, as will presently appear. The driving shaft 109 has thereupon a semi-circular member 134 that engages the rear side of the point 129 that is on the cam member 128, as the shaft 109 is driven in the direction of the arrow X. The member 134 remains in engagement with the pin 129 until the point 135 of the cam has moved slightly beyond an instantaneous center line passing through the center of a roller 136 and the center of the shaft 109. The roller 136 is mounted upon the free end of a lever 137 that is pivotally mounted on a pin 138 which is screwed into the casing and this lever is normally forced in the direction of the arrow Y by a link 139. One end of the link is connected at 140 to the lever 137 and the other end of the link is connected at 141 to the free end of a spring 142. This spring 142 has an end fixed at 143 to the casing and a coiled portion 144 of the spring engages a pin 145 carried by the casing. The roller 136 is forced by the spring against the cam and with sufficient force so that when the pin 135 of the cam is moved past the instantaneous center previously referred to the roller will engage the cam surface 146 and move the cam in the direction of the arrow X so that the pin 129 will move away from and ahead of the semi-circular member 134. In other words, as the roller 136 is forced to move in the direction of the arrow Y against the cam surface 146 it causes the cam 128 and the movable contact member which includes the part 131 and the contact member proper 132 to pass through the final movement in the direction of the arrow X. The movement of the contact member 132 may be considered to be in two parts; to wit, a preliminary or initial movement which is imparted to it by the machine part turning the shaft 109, and during which preliminary movement the movable contact is brought toward but not into engagement with the stationary contacts of the switch, and the final or subsequent movement which is imparted to it by the said spring pressed roller, and during which final movement the movable contact is moved into and out of engagement with the stationary contacts. Only an instantaneous or momentary closing of the switch takes place during the final movement because the switch is not directly closed from the shaft 109 but is indirectly closed by the spring pressed roller 136 acting on the cam 128.

The construction of the member 134 has therefore been made semi-circular or of such a shape as to permit and not obstruct the entire movement of the contact member 132 into and out of engagement with the stationary contacts 116 and 117. It will therefore be seen that no matter in what position the shaft 106 should stop rotating the transmitting or momentary contact or switch which comprises the stationary contacts 116 and 117 and the movable contact 132 will never remain in switch closing position because it can be closed only for an instant, due to the spring construction contained in the casing, since as above indicated the closing is indirectly dependent upon the shaft positioning the cam 128 which is operated upon by a spring pressed roller, and the latter may be considered as the mechanism that directly effects the closing of the switch. The switch shown in Figs. 7 to 10 inclusive and above described is properly referred to as the transmitting or momentary switch or contact and is designated in Fig. 15 as $TA^1$, $TA^2$, $TA^3$, $TB^1$, $TB^2$, $TC^1$ and $TC^2$ and in Fig. 16 as $TA^1$, $TA^2$ and $TA^3$.

*Automatic or output switch.*

The automatic or output switch is constructed in a manner to be dependent for its operation upon the output being delivered from the machine. The construction of this switch will probably vary due to the particular output from any machine. In Figs. 11 to 13 inclusive there is shown an output switch which is adapted for employment where the output from the machine is a continuously running product, such as a web or strip of paper being delivered from a printing press. With a printing press it is feasible to place rollers in engagement with the web of the press, so as to turn the rollers as the paper is moving through the press. To these rollers the switch shown in Figs. 11 to 13 inclusive is connected in a manner whereby a shaft 147 of the switch will rotate while the rollers that are in engagement with the web or strip of paper are being rotated and so that when the movement of the paper from the press is arrested the movement of the rollers in engagement with the web or strip of paper is arrested and consequently the movement of the shaft 147 is arrested. When there is no product being delivered from the machine or press with which the automatic switch is associated the parts of the switch occupy the position shown in Fig. 12 and this position will be referred to as the inoperative position of the switch. When, however, a product is being delivered from the machine or press with which the switch is associated the parts of the automatic switch occupy the position shown in Fig. 11. There is shown on the shaft 147 a coupling member 148 that can be employed to mechanically couple the switch to the mechanism driving the same. The particular automatic switch shown in Figs. 11 to 13 may be referred to as a centrifugal switch since it is dependent for its action on the centrifugal force of balls or weights, and its operation is similar in many respects to the well known centrifugal ball governor frequently used with steam engines. The switch comprises a casing having a body member 149 and a cover 150 secured to the body member in any suitable manner whereby the switch construction in the casing cannot be tampered with. The shaft 147 is carried in suitable bearings, as 151 in the body member 149 and 152 in a cross-bar 153, secured in place on the casing as by means of screws 154. At the upper end of the cross-bar 153 there is a piece of insulating material 155 secured in place on the cross-bar 153, as by screws 156. There is preferably carried by this insulating material 155 two stationary contacts 157 and 158. The contact 157 has a connecting member 157' to which a leading-out wire 157'' is connected. The contact 158 has a connecting member 158' to which another leading-out wire 158'' is connected. The contact 158 could be omitted if it were not desired to employ the red or inoperative signal which is hereinafter described. At the lower end of the cross-bar 153 there is carried a bearing 159 upon which there is pivotally mounted a member 160 of insulating material and to this member of insulating material there is secured by means of screws 161 a contact member 162. The member 160 of insulating material and the contact member 162 constitute what may be considered as the movable contact of the switch. When the switch is inoperative the contact member 162 engages the stationary contact 158 only, if such a contact is used. When, however, the switch is in operation and the parts occupy the position shown in Fig. 11 the contact member 162 engages the stationary contact 157. It will here be remarked that the member 130

162 is preferably of spring material so that said contact will press against one or the other of the stationary contacts when the parts occupy the position shown in Fig. 11 or Fig. 12. The contact 157 is referred to as the "operative" contact because the circuit can be completed through this contact when the machine is delivering an output and for a converse reason the contact 158 may be referred to as the "inoperative" contact. The movable contact has a connecting portion 162' to which the leading-in wire 162'' is connected. Upon the shaft 147 there is a collar 163 secured in place by a screw 164. The shaft construction is such that this collar practically remains in engagement with or near the inner side of the casing and to this collar there are pivotally connected at 165 links 166. At the free ends of these links 166 there are secured balls or weights 167. A sleeve 168 is slidably mounted upon the shaft and to this sleeve there are connected at 169' links 170. These links 170 are connected at 171 to the links 166. A tension spring 172 is connected at one end to one of the weights and at the other end to the other weight so as to normally tend to pull the weights toward each other whereby they will occupy the position shown in Fig. 12. The sleeve 168 has a grooved portion 173 into which there extends a pin 174 that is on the member 160 of insulating material and as the sleeve 168 is caused to move along the shaft 147, due to the change in position of the weights as they rotate, it regulates through the medium of the pin 174 the position of the contact member 162. In other words, when the weights occupy the operative position shown in Fig. 11 the pin 174 holds the contact member 162 in engagement with the stationary or operative contact 157, whereas when the weights occupy the inoperative position shown in Fig. 12 the pin 174 holds the contact member 162 in engagement with the inoperative contact 158. The automatic switch shown in these figures is connected, as will hereinafter appear, in the system in such a manner that when the parts occupy the position shown in Fig. 12 no counting operation can be performed and the movable contact member 162 and supporting contact member 158 serve to cause a flashing or giving of an "inoperative" signal, while when the parts occupy the position shown in Fig. 11 a counting operation can be performed when the momentary or transmitting switch previously described closes. It will hereinafter appear that the transmitting switch is connected in the same circuit which includes the stationary contact 158 and the movable contact member 162. It will also hereinafter appear that when the automatic or output switch is in operative position and closed and the transmitting contact or switch is also closed the "operative" signal is flashed or given. As the operation of the switch shown in Figs. 11 to 13 inclusive is dependent for its operation upon the output it has been referred to as the output switch. This switch or the equivalent thereof is a switch indicated as $OA^1$, $OA^2$, $OA^3$ and $OB^1$ in Fig. 15 or as $OA^1$, $OA^2$ and $OA^3$ in Fig. 16.

*Clock.*

A clock or time element is preferably associated with and installed as a part of the apparatus and the clock has associated therewith a momentary contact switch CMS which is similar in its function and mode of operation to the momentary contact or switch previously described, for the reason that although the switch is operated by the clock there will be only a momentary or instantaneous closing of the switch no matter in what position the mechanism of the clock may be. In Figs. 15 and 16 there is indicated a wheel 175 which is either a part of or is driven by a clock train. Concentric with the axis of the wheel and movable relatively thereto there is a circular movable contact member 176 having insulating material in which there is embedded a metallic conductor 177. This movable contact member is associated with two stationary contacts 178 and 179 through which the circuit is completed when the metallic conductor 177 is in engagement with the contacts 178 and 179. This movable contact member 176 also has a weighted member 180 connected to it in order that they may move together. The wheel 175 moves in the direction of the arrow z and carries a pin 181 which, during a portion of its movement, engages the rear side of the weighted member 180; that is the pin 181 engages the rear side of the member 180 until this member is moved from the lower vertical position and to an upper vertical position and to a slight distance beyond said vertical position, at which time the weighted member falls carrying the contact member 176 practically a semi-revolution so that the metallic conductor 177 has an instantaneous or momentary movement into engagement with both of the stationary contacts and out of said engagement, thus closing the circuit which includes the contact elements 178, 177 and 179 for only a short period of time. The construction just described constitutes the clock momentary switch CMS. When the closing of this switch takes place the printing operation previously described is effected.

*General diagram.*

It has heretofore been intimated that several banks of counters will be employed in a single installation and in Fig. 15 there are indicated diagrammatically three banks of counters BA, BB and BC. These banks instead of being shown as having five counters in each are, for the sake of simplicity, shown with a less number of counters to a bank. For instance, bank BA has three counters and the banks BB and BC each has two counters. A machine is indicated for each counter. The counters in the banks are designated by $CO^1$, $CO^2$ and $CO^3$, the common shaft for each bank of counters by CS, the counter-operating mechanism for each counter by $CM^1$, $CM^2$, $CM^3$. The shaft CS actuates each counting-operating mechanism when allowed to do so by the magnet $MA^1$, $MA^2$ or $MA^3$ corresponding to the counting mechanism. Each bank also comprises the printing mechanism PR and the printing mechanism operating means PM. There is associated with the printing mechanism a magnet as MA, MB or MC, as the case may be, for controlling the operation of the printing mechanism from its shaft CS. A main shaft MS is constantly driven by a motor MO and the common shaft CS of the several banks is continuously driven from this main shaft MS by belts BE. This motor, main shaft and shafts operated thereby may be considered as a mechanism common to all the counters for actuating the several counters of the banks of counters and for actuating the printing mechanism associated with said banks of counters when allowed to do so by the controlling mechanisms or means which include the magnets previously referred to.

The machines which are associated with the counters are designated as $XA^1$, $XA^2$, $XA^3$, $XB^1$, $BX^2$, $XC^1$ and $XC^2$. Each of these machines has associated with it a transmitting switch as $TA^1$, $TA^2$, $TA^3$, $TB^1$, $TB^2$, $TC^1$ and $TC^2$. The magnets associated with each of these machines receive electrical energy from the source of electrical supply ES indicated by the plus and minus wires. These machines may be of the same type or may be of different type. Some of these machines are indicated as employing the output switches $OA^1$, $OA^2$, $OA^3$ and $OB^1$ whereas other of the machines are indicated as employing no output switch.

From the diagram shown in Fig. 15 it will be observed that the transmitting switches and the output switches are in series and may be considered to constitute companion switches. When one switch is open no current can flow through the other switch so as to energize its corresponding counting controlling magnet, even though its companion switch is closed. There are also indicated on the diagram operative signals $SA^1$, $SA^2$, $SA^3$, $SB^1$, $SB^2$, $SC^1$, $SC^2$ for each machine and inoperative signals $IA^1$, $IA^2$, $IA^3$ and $IB^1$ for each machine. It will here be noted that each output switch may be considered to be in two circuits and that it therefore has a movable contact 162 which is either in engagement with stationary contact 157 that may be considered in an "operative" circuit SC or with stationary contact 158 that may be considered in an "inoperative" circuit IC. It will be observed that the operative signals $SA^1$, $SA^2$, $SA^3$ and $SB^1$, $SB^2$, $SC^1$, $SC^2$ may be considered to be connected in parallel with the circuit that includes the magnets $MA^1$ or $MA^2$, as the case may be, and these signals are lighted, if they are lamps, each time the magnet corresponding thereto is energized. The inoperative signal is in a circuit which is completed when the movable contact 162 of the output switch engages the inoperative contact 158 of the output switch.

In order that the reading of the counters of the several banks will be printed or recorded at certain timed intervals a clock CL is provided to cause a closing of the circuit which includes the magnet MA, when the clock momentary switch CMS is closed. In the diagram shown in Fig. 15 the counters $CO^1$, $CO^2$, etc., correspond to the counters indicated in Fig. 1. The counting-operating mechanism $CM^1$, $CM^2$, etc., correspond to the counting-operating mechanism heretofore described. The shaft CS corresponds to the shaft CS in Fig. 1 and it will be noted is operated in a continuous manner. The printing mechanism PR and the printing mechanism operating means PM of Fig. 15 correspond to the similar mechanisms heretofore described. The transmitting contacts as $TA^1$, etc., indicated in the diagram are the same as the transmitting contact shown in Figs. 6 to 10 inclusive and the automatic switches or output switches indicated in the diagram as $OA^1$, $OA^2$, etc., are or may be the same as the automatic switches or output switches shown in Figs. 11 to 13 inclusive, and from the description heretofore given it will be manifest how the output from any one machine will be recorded by the counter corresponding thereto.

In order that the motor MO may be as small as possible it is desirable that the printing of the record be performed in only one bank of counters at a time. If the printing were to be performed simultaneously in all of the banks then the magnets MA, MB and MC would all be connected so that the electrical energy would be simultaneously supplied to them all by the closing of the clock momentary switch CMS. According to the diagram shown in Fig. 15 the magnet MA that controls the operation of the printing mechanism is the only magnet which is directly energized by the closing of the clock momentary switch CMS. When this magnet is energized it causes the printing mechanism which is shown and described in connection with Figs. 1 and 14 to operate and causes the feeding of the paper, as has been previously described in connection with the description relating particularly to said figures. After the printing mechanism is operated and as the feeding of the paper takes place there is closed, by means of a switch CT, a circuit which includes the magnet MB. The switch CT just referred to is shown in Figs. 1 and 14 and comprises a movable insulated contact member 182 that engages stationary contact members 183 and 184. The insulated contact member 182 is carried on the pivoted lever 58 which has been heretofore described as a part of the feeding mechanism operating means. When the switch CT is closed it causes the magnet MB to become energized where the printing can be effected in the banks of counters, as BB, and immediately after this printing operation is performed the switch CT on the bank of counters BB is closed whereby the magnet MC becomes energized thus causing the printing operation to take place in the bank of counters BC. In this way the printing is performed in succession along the several banks of counters in the installation, no matter how many there are. This switch CT may be omitted from the bank of counters BC.

In Fig. 16 the wiring diagram is illustrated as having three machines, to wit, XA¹ XA² XA³ that are associated with the counters of bank BA of Fig. 15. This wiring diagram illustrates and typifies the manner in which the machines of an installation can be connected up to the counters of the bank, whether there are two, three, four, or more counters in the bank. As applicant at present prefers to install the apparatus, five counters are used in a bank. The wiring for machine XA¹ is as follows:

The line extends from point 185 of the plus wire to 186, thence to point 187 where it is connected to the movable contact member 162. If the movable contact member 162 for machine XA¹ is in the position shown in Fig. 16 then the current flows from operative stationary contact 157 to 188, thence to contact 116 through the metallic contact 132 of the transmitting contact or momentary switch TA¹, to contact point 117, to points 189, 190, 191, 192, 193, to the coils of magnet MA¹ and from the magnet MA¹ to points 195, 196, 197, 198, 199, to a common wire 200, to point 201 and finally to point 202 of the plus wire. This effects an energizing of the magnet controlling the counter whereby a counting operation can be effected. When the magnet is energized some of the current can also flow from point 193 to 203, 204, through white light or signal 205, to 206, 207, 208 and 209. If for any reason the machine XA¹ should not be delivering any output or product then the conducting member 162 of the output switch OA¹ engages the operative contact 158 and the current is interrupted so that it cannot pass to the transmitting switch TA¹. When the contact member 162 is engaging the inoperative contact 158 current can flow to 210, 211, 212, 213, 214 and 215 to the red light or signal 216, thence to 217 and to 207, 208 and 209.

Under these conditions it will be manifest that the red light will be illuminated. Similarly the circuits can be traced through the transmitting contacts and the output switches for the machine XA² and XA³, and it will be noted that the white light or the red light that corresponds to each machine is flashed, dependent upon whether or not the machine is in operation and delivering output or whether the machine is at rest and with no output.

The wiring diagram whereby the clock CL and the clock momentary switch CMS can regulate the energizing of the magnet MA for the printing mechanism will be apparent from an inspection of Fig. 16, the current flowing from the plus wire to 218, 219, to contact 178, through the movable contact member 177 from the contact member 179, over the line leading to 220, 221, 222, 223 to the magnet MA. From the magnet MA current passes over a line leading back to the negative wire. When the switch CT has been closed by a part associated with the printing mechanism operating means forcing the movable contact 182 into engagement with the contact members 183 and 184 the current can flow from 218 to the switch CT, thence to 224, 225, 226, 227 to the magnet MB¹ that controls the printing mechanism of the succeeding bank of counters and from this magnet it passes to the negative line. The magnets that control the successive sets of printing mechanisms can be brought into operation by the switches CT, no matter how many banks of counters there are. It will therefore be seen that all of the printing operations are effected either directly or indirectly from the closing of the clock momentary switch CMS. In the installing of the apparatus it is quite important that the shaft CS rotates faster than the fastest member of the members 134 of the transmitting switches, which members 134 are on the shafts 109 and which members 134 move or drive the movable contacts of the transmitting switches through the preliminary or initial movement that these contacts have, but it will be understood that the movable contact of each switch jumps ahead of its driving member 134 in order that the stop 20, which is ultimately controlled by the particular switch, may return in time to arrest the catch or pawl at each revolution. This jumping ahead of the driving member 134 is enabled to be realized due to the spring construction heretofore described, to wit, the spring construction that includes the spring pressed roller 136 acting on the cam 128 and which spring construction is relied upon to impart the final or subsequent movement of the movable contact. During this final or subsequent movement each movable contact 132 is moved, as has been previously stated, into and out of engagement with its associated stationary contacts 116 and 117 and the angular velocity of the movable contact at this time is greater than that of the shaft CS. It is also advisable to incase the combined counting and printing mechanisms and the magnets controlling the same so that these parts cannot be tampered with, and also to incase or inclose all of the electric wires in armored conduits so that they cannot be tampered with. In other words, when the installation is complete the correct total output of the several machines with which the apparatus is associated is readily determinable in a central office, the apparatus or installation being accessible only to those authorized to inspect and maintain the same.

The improvements herein set forth are not limited to the precise construction and arrangement shown and described for they may be embodied in various forms and modifications without departing from the spirit and scope of the invention.

What I claim is:

1. An apparatus of the class described having in combination electrically-controlled shaft-driven counting mechanism for registering the number of movements of a machine part by connecting to said machine part a transmitting switch having a stationary contact member or members and a movable driven contact member that completes a circuit whereby an electrical impulse is transmitted to the electrically-controlled mechanism each time the movable driven contact member engages the stationary contact member or members and thus causes a closing of said circuit, the construction being such that the movable driven contact member when in engagement with the stationary contact member or members is moving at a greater angular velocity than the shaft which drives the counting mechanism.

2. An apparatus of the class described comprising a counter for counting the number of movements of a machine part, a transmitting switch having a movable contact member driven by said machine part, and counting-operating mechanism moving at a slower speed than the movable contact member of the transmitting switch when said movable contact member is completing a circuit, which counting-operating mechanism is under the control of said transmitting switch.

3. An apparatus of the class described comprising in combination a counter for counting the number of movements of a machine part, a momentary switch associated with said machine part, and counting-operating mechanism operated from a shaft moving at a slower speed than the movable element of the momentary switch when the latter is completing a circuit, the operation of the counting-operating mechanism being under the control of said momentary switch.

4. An apparatus of the class described comprising in combination means for counting the number of movements of a machine part, a revolving shaft, an electric magnet in a circuit having a switch associated with said machine part, which switch has a stationary contact member or stationary contact members and a movable contact member that can be brought into engagement with the stationary contact member or members to close the switch but which switch is constructed so that the movable contact member can remain in engagement with said stationary member or members only a moment or instant under any conditions, and mechanism associated with said revolving shaft, said counting means and said electric magnet in such a manner that upon said magnet becoming energized by a closing of the switch the shaft through the medium of said mechanism actuates the counting means.

5. An apparatus of the class described for counting the movements of different machine parts, said apparatus having a plurality of counters mechanically operated by a common revolving shaft which revolves at a given speed while the counters actuated by said shaft will operate respectively according to the speed of the machine part with which they are associated, irrespective of the different speeds of the other machine parts.

6. An apparatus of the class described comprising in combination a device for counting the number of movements of a machine part, said device comprising a counter, a magnet and a revolving shaft for mechanically actuating said counter when permitted to do so by said magnet, and a transmitting switch for the magnet circuit which switch is constructed so that the magnet circuit can be closed but only momentarily under any conditions.

7. In combination with a rotating machine part, an electric magnet, a momentary switch in circuit therewith and having a rotatable contact member which is partly moved by said machine part and partly by a spring means, a continuously revolving shaft, and counting mechanism operated by said shaft when permitted or caused to do so by said magnet which is energized when said momentary switch is closed, said shaft being continuously rotated at a faster speed than the speed of rotation of the machine part, the switch construction being such that the rotatable contact member can remain in closed position for only an instant under any conditions because of said spring means.

8. In combination with a rotating machine part of a momentary switch having a movable contact associated with said machine part in such a manner that a preliminary or initial movement of said movable contact is caused by a movement of the machine part, said switch having spring means that effects the final or subsequent movement of said movable contact and during which final or subsequent movement the switch is first closed and subsequently opened, an electric magnet in a circuit controlled by said switch, and a counting mechanism controlled by said magnet.

9. In combination with a rotating machine part, a momentary switch having a movable contact associated with said machine part in such a manner that said machine part can drive the movable contact during a preliminary or initial movement, said switch having spring means for moving said contact through a final or subsequent movement during which final movement the switch is opened, a magnet under the control of said switch, a continuously rotating shaft, and a counting mechanism which is intermittently operated from said shaft when allowed or caused to do so by the energizing of said magnet.

10. In combination with a rotating machine part, an electric magnet, a momentary switch controlling said magnet and having a rotatable contact member associated with said machine part, a continuously rotatable shaft, and counting mechanism operated by said shaft, the operation of said mechanism from said shaft being under the control of said magnet, the construction of the momentary switch being such that said movable contact member when in engagement with the other contacts of the switch has a greater angular velocity than said shaft.

11. In combination with a rotating machine part, an electric magnet in a circuit that includes a momentary switch having a rotatable contact that successively engages a stationary contact to successively open and close a switch, a continuously rotating shaft, and counting mechanism operated by said shaft when caused or allowed to do so by the magnet, the momentary switch being constructed in such a manner and associated with the shaft in such a manner that the rotatable contact makes a complete revolution each time the machine part completes a revolution and so that during a part of the time the rotatable contact is moving faster than said machine part.

12. In combination with a movable machine part, an apparatus comprising a rotating shaft, counting mechanism operated from said shaft, a printing mechanism operated from said shaft, a magnet for controlling the operation of said counting mechanism from said shaft, a magnet for controlling the operation of the printing mechanism from said shaft, means for energizing the magnet of the printing mechanism at predetermined periods, and means associated with the movable machine part for energizing the magnet associated with the counting mechanism whereby the counting mechanism can be actuated from the shaft in synchronism with the rotation of the machine part, the printing mechanism being arranged so as to print the reading of the counter when the printing mechanism is actuated.

13. An apparatus of the class described comprising in combination a continuously rotating shaft, counting mechanism associated with and driven from said shaft when operatively connected to said shaft, electric means which when operated causes or allows the counting mechanism to be driven from said shaft said electric means being under the control of a momentary transmitting switch associated with a movable part of the machine, which part is in synchronism with the output of the machine, and an output switch under the control of the production or output of the machine, said switches being in the same circuit.

14. An apparatus of the class described comprising in combination a counter, electrical means controlling the actuation of the counter, a transmitting switch that is closed and opened in synchronism with a movable operative element of a machine, the output of which machine is to be counted, and an output switch which is dependent as to its position upon there being an output from the machine, the electrical means being under the joint control of said switches.

15. In combination with a machine, a counting mechanism, electrical means for controlling the counting mechanism, a momentary transmitting switch associated with a movable operative element of the machine in a manner to successively close in unison with the movement of said operative element, and an output switch that is under the control of the output of the machine, the electrical means being under the joint control of said switches.

16. An apparatus for recording the output of a machine which apparatus comprises in combination with the machine a continuously rotating shaft, a counting mechanism operated by said shaft when connected to the shaft, an electric magnet for controlling the connection to the shaft, a transmitting switch that is opened and closed as a machine part rotates, and an output switch which is closed when the output is being delivered from the machine, said switches being in the circuit which includes the electric magnet whereby said magnet can be energized only when both switches are closed.

17. An apparatus for recording the output of a machine which apparatus comprises in combination with the machine a continuously rotating shaft, a counting mechanism operated by the shaft when operatively connected to the shaft, an electric magnet for controlling the connection to the shaft, a transmitting switch that is opened and closed as the machine part rotates, and an output switch which is closed only when the output is being delivered from the machine, said switches being electrically associated with each other and with the electric magnet in such a manner that said magnet can be energized in synchronism with the rotation of the machine part by a successive closing of the transmitting switch but only when both switches are closed.

18. An apparatus of the class described for recording the output from a plurality of machines, which apparatus comprises in combination a continuously rotating shaft, counting mechanism for each machine, an electric magnet for each counting mechanism for controlling the actuation of said counting mechanism from said shaft, and a momentary switch corresponding to each magnet for controlling the energizing of the magnet with which it is associated, each momentary switch having a movable contact which is associated with and actuated partly by a part of the machine that corresponds to the counter with which the magnet is associated, said movable contact member being actuated partly by a spring means constructed so that the switch can remain closed for only a moment or instant.

19. An apparatus of the class described comprising in combination continuously rotating mechanism, a plurality of counting mechanisms associated therewith and driven therefrom when operatively connected thereto, and electric means for each counting mechanism for controlling the connecting of said counting mechanisms to said continuously rotating mechanism, each of said electric means having and being under the joint control of a transmitting contact or switch which is opened and closed in synchronism with an operative element of the machine and an output switch which is closed only when output is being delivered from the machine.

20. An apparatus of the class described comprising in combination a continuously rotating shaft, a plurality of counting mechanisms associated with said shaft and driven therefrom when operatively connected thereto, and an electric magnet for each counting mechanism for controlling the connecting of said counting mechanism to said continuously rotating shaft, each of said electric magnets having and being under the joint control of a momentary contact or switch that closes in synchronism with the movement of an operative element of the machine, and an output switch which is closed only when output is being delivered from the machine.

21. An apparatus of the class described comprising in combination a continuously rotating shaft, a plurality of counting mechanisms associated with said shaft and driven therefrom when operatively connected thereto, and an electric magnet for each counting mechanism for controlling the connecting of said counting mechanism to said continuously rotating shaft, each of said electric magnets having and being under the joint control of a momentary contact or switch and an output switch, there also being provided a white light or signal which is connected across the terminals of the electric magnet.

22. An apparatus of the class described comprising in combination a continuously rotating shaft, a plurality of counting mechanisms associated with said shaft and driven therefrom when operatively connected thereto, and an electric magnet for each counting mechanism for controlling the connecting of said counting mechanism to said continuously rotating shaft, each of said electric magnets having and being under the joint control of a momentary contact or switch and an output switch, there also being provided a red light or signal which is in an electric circuit, the output switch being constructed so as to complete said circuit when the output switch is in an inoperative position, the circuit through the momentary contact or switch being completed only when the output switch is in its operative position.

23. An apparatus of the class described comprising in combination a common shaft, a plurality of counting mechanisms associated with said shaft, a printing mechanism associated with said shaft and arranged so as to record, when operated, the readings of the counters of the counting mechanisms and a magnet for each mechanism for controlling the operation from the shaft of the particular mechanism with which the magnet is associated.

24. An apparatus of the class described comprising in combination a motor driven shaft, a counting mechanism associated with said shaft, a printing mechanism associated with said shaft and arranged so as to print when actuated the record of the counter of the counting mechanism, a magnet for controlling the operation of the counting mechanism from the shaft, and a clock controlled magnet for controlling the actuation, at predetermined periods, of the printing mechanism from the shaft.

25. An apparatus of the class described comprising in combination a common shaft, a plurality of counting mechanisms associated with said shaft, a printing mechanism associated with said shaft and arranged so as to record when operated the readings of the counters of the counting mechanisms, and a magnet for each mechanism for controlling the operation from the shaft of the particular mechanism with which the magnet is associated, the magnet for the printing mechanism being a time controlled magnet.

26. An apparatus or installation of the class described in combination with a source of electrical power comprising the usual plus and minus wires, a rotating shaft, a mechanical element associated with said shaft, mechanism between said element and said shaft whereby when said mechanism is connected to said shaft it can be driven thereby, a magnet in a circuit connected to said plus and minus wires for controlling the connection to the shaft, an electric signal connected across the terminals of said magnet, a momentary switch and an output switch in series in the magnet circuit, which switches are constructed so that the circuit is closed only when both switches are closed.

27. An apparatus or installation of the class described used in conjunction with a machine, which apparatus includes in combination with a source of electrical power comprising the usual plus and minus wires a rotating shaft, a mechanical element associated with said shaft, mechanism between said element and said shaft whereby when said mechanism is connected to said shaft it can be driven thereby, a magnet in a circuit connected to said plus and minus wires for controlling the connection to the shaft, a momentary switch which is opened and closed in synchronism with the movement of the output of the machine, and an output switch controlled by the output and constructed so that it is closed only when an output is being delivered from the machine, which switches are in series in the magnet circuit and are constructed so that the circuit is closed only when both switches are closed.

28. An apparatus or installation of the class described comprising in combination with a machine, a rotating shaft, a mechanical element associated with said shaft, mechanism between said element and said shaft whereby when said mechanism is suitably connected to the shaft it can be driven thereby, an electric magnet for controlling said connection to the shaft, a transmitting switch which closes in synchronism with an operating element of the machine whereby if otherwise allowed to so do said transmitting switch will cause a completion of a circuit that will cause the electric magnet to become energized, the construction being such that the circuit that includes the magnet will remain energized for only a moment or instant under any conditions, and an output switch associated with the output of the machine, the construction of such output switch being such that unless an output is being delivered from the machine the magnet cannot be energized.

29. An apparatus or installation of the class described comprising in combination with a machine, a rotating shaft, a mechanical element associated with said shaft, mechanism between said element and said shaft whereby when said mechanism is suitably connected to the shaft it can be driven thereby, an electric magnet for controlling said connection to the shaft, a transmitting switch which closes in synchronism with an operating element of the machine whereby if otherwise allowed to do so said transmitting switch will effect a completion of a circuit that will cause the electric magnet to become energized, and an output switch associated with the output of the machine, the construction of said output switch being such that unless an output is being delivered from the machine the magnet cannot be energized.

30. An apparatus of the class described comprising in combination with a machine, a counting mechanism that is electrically controlled by the joint coöperation of a transmitting switch that is successively opened and closed in synchronism with a movable operative element of the machine, and an output switch that is under the control of the output being delivered from the machine, the construction and arrangement of the switch being such that the output of the machine can be counted but so that no count will be made when there is no output.

31. An apparatus or installation of the class described in combination with a source of electrical power comprising the usual plus and minus wires, a rotating shaft, a mechanical element associated with said shaft, mechanism between said element and said shaft whereby when said mechanism is connected to said shaft it can be driven thereby, a magnet in a circuit connected to said plus and minus wires for controlling the connection to the shaft, a momentary switch the sequence of opening and closing of which is a function of the speed of production or output, and an output switch the closing of which is a function of the delivery of the production or output, which switches are in series in the magnet circuit and are constructed so that the circuit is closed only when both switches are closed.

32. An apparatus for recording the output of a machine which apparatus comprises in combination a source of electrical energy, a rotating shaft, a counting operating mechanism associated with said shaft and constructed so as to be operated from the shaft when connected thereto, electric means whereby a connection is made to the shaft when said electric means is operated, the operation of which electric means is under the control of or in a circuit that receives its energy from said source of power and which circuit includes in series a transmitting contact which is connected to a member of the machine that is moving when the machine is operating, and an output switch the position of which last mentioned switch is dependent upon there being an output from the machine, the construction being such that the electric means is energized only when both switches are closed.

33. In combination with a machine of an apparatus for counting the output of the machine, which apparatus comprises in combination a transmitting switch that moves in unison with a part of the machine that moves as the machine operates, an output switch that is dependent for its operation upon the machine output, a rotating shaft, a counter, counting operating mechanism between said shaft and said counter, and an electric means whereby when the electric means is operated it will cause the shaft through the medium of the counting mechanism to actuate the counter, the electric means being dependent for its operation upon the closing of the transmitting contact or switch and the output switch.

34. An apparatus of the class described comprising in combination a source of electrical energy, a rotating shaft, counting mechanism associated therewith, an electric magnet controlling the operation of said mechanism by the shaft said magnet being included in a circuit connected to said source of supply, there being a transmitting switch and an output switch included in series in said circuit and arranged so that the circuit is completed only when both of said switches are closed, and a signal connected across the terminals of the magnet whereby the signal will be given each time the magnet is energized, the output switch being constructed so that when the magnet is not energized the output switch will serve to complete another circuit in which another kind of electric signal is included.

35. An apparatus of the class described comprising in combination a series of banks of counters, common mechanical operating means for said several banks of counters, a printing mechanism for each bank of counters and associated with said common operating means, a magnet for controlling the operation of each set of printing mechanism from said common mechanical operating means, a clock having a momentary switch for completing a circuit in which one of said magnets is included whereby when said magnet is energized the printing mechanism associated therewith will be actuated, there being associated with the mechanism just actuated a switch that is included in a circuit within which a succeeding magnet can be energized and which switch is closed after the printing operation has been performed by the printing mechanism with which it is associated whereby a printing operation can be performed in a succeeding set of banks of counters.

36. An apparatus of the class described comprising in combination a series of banks of counters actuated from a common source of mechanical power, each bank of counters having common to the counters thereof a printing mechanism, and mechanism between each of said printing mechanisms and said common source of power whereby at predetermined intervals said printing mechanisms can be actuated from said common source of power, a clock controlling a switch which is closed at said predetermined intervals, a magnet which is controlled by the closing of said switch to cause the operation of one of said sets of printing mechanisms from said common source of power, there being associated with said printing mechanism a switch which closes after said printing operation has been performed by said printing mechanism, and a circuit in which a magnet is included that controls a succeeding printing operation the construction being such that a printing operation is performed in succession for each of the banks of counters.

37. An apparatus of the class described comprising in combination a frame, a plurality of counters carried by the said frame, a shaft secured to said frame, counting-operating mechanism for each counter which counting-operating mechanism is associated with said shaft, a printing mechanism arranged to print the total of said counters, printing mechanism operating means associated with said shaft, a magnet for each counter which when energized permits the counting-operating mechanism to be actuated from said shaft the magnet construction being such that when deënergized it normally maintains its corresponding counting-operating mechanism functionally inoperative, and a magnet for said printing mechanism which magnet when energized permits the printing mechanism operating means to be operated from said shaft but which when deënergized normally maintains the printing mechanism operating means functionally inoperative.

38. An apparatus of the class described comprising in combination a frame, a plurality of counters carried by the said frame, a shaft secured to said frame, counting-operating mechanism for each counter, which counting-operating mechanism is associated with said shaft, a printing mechanism arranged to print the total of said counters, printing mechanism operating means associated with said shaft, a magnet for each counter which when energized permits the counting-operating mechanism to be actuated from said shaft, the magnet construction being such that when deënergized it normally maintains its corresponding counting-operating mechanism functionally inoperative, and a magnet for said printing mechanism, which magnet when energized permits the printing mechanism operating means to be operated from said shaft but which when deënergized normally maintains the printing mechanism operating means functionally inoperative, said printing mechanism operating means having a cam for moving it from a normal to an abnormal position and for thereafter moving a paper feeding means, there being associated with and under the control of said cam a movable contact member for closing a switch after the printing operation has been performed.

39. An installation of the class described comprising in combination a plurality of machines each having a transmitting switch associated with a movable part of the machine which moves in synchronism with the operating element of the machine and an output switch that is under the control of the output of the machine, a counter for each machine, a shaft for operating said counters, an electric means for each counter which means is under the control of said transmitting and output switches, the function of which electric means is to cause or allow the counter to be operated from the shaft when the transmitting switch and the output switch of the machine corresponding thereto are closed.

40. An apparatus for recording the output of a machine in which the output is in the form of a continuous web, which apparatus comprises in combination a momentary transmitting switch associated with a part of the machine which moves in synchronism with the travel of the web through the machine, a centrifugal output switch that is associated with said web, and counting mechanism which is actuated each time the transmitting switch and the output switch are both closed.

41. An apparatus of the class described comprising in combination a plurality of machines, a counter for each machine, a common operating mechanism for the counters, and electrical means associated with each counter which electrical means is energized when an output switch associated with the machine and arranged to be under the control of the output and a transmitting switch associated with a member of the machine that moves in synchronism with the output of the machine are simultaneously closed, the construction being such that when the electrical means is operated the counting means corresponding to that particular machine will be actuated from said common operated mechanism.

42. An installation of the class described comprising in combination with a plurality of machines which have a transmitting switch, an output switch and a counting mechanism corresponding thereto, means common to the counting mechanisms for actuating the same when said counting mechanisms are operatively connected to said means, printing mechanism associated with said mechanisms and operated from said common operating means, a clock controlling means for periodically controlling the operation of the printing mechanism from said common means, and an electric means for each counting mechanism for controlling the connection of the counting mechanism from said common operating means, which electric means is in turn controlled by the simultaneous closing of the transmitting switch and the output switch of the machine to which it corresponds.

43. A device of the class described comprising in combination a frame supporting a bank of counters, a shaft, operating mechanism for each counter which mechanism is normally functionally inoperative but which is provided with means for permitting the counting-operating mechanism to be operated from said shaft, a printing mechanism carried by said frame, printing mechanism operating means constructed so that the printing mechanism can be operated from said shaft, there being provided on the frame and operated from said shaft means for supporting and feeding paper to a position where the reading of the counters can be recorded.

44. An apparatus of the class described comprising in combination a counter and means for recording the total number of movements of a machine part as registered by the counter at predetermined periods by the aid of a time controlled magnet arranged with a mechanical device operated by a revolving shaft in such a manner that when said magnet is energized the mechanical device actuates a printing mechanism to record the reading or register of the counter.

45. An apparatus of the class described having a counter for registering the total number of movements of a machine part and also having means for recording the reading of the counter at predetermined periods by an electrical device comprising a magnet which is arranged with a mechanical device operated by a revolving shaft in such a manner that when said magnet is energized the mechanical device actuates a printing mechanism, said printing mechanism comprising means for moving a strip of paper that receives the record, a typewriter ribbon that is employed in the printing operation, means for moving said ribbon, and means for inking said ribbon.

46. An apparatus of the class described comprising in combination a transmitting contact which normally opens and closes a circuit in synchronism with the output of the machine, a counter controlled by the opening and closing of said circuit and means for disconnecting or disrupting said circuit when a machine part to which said transmitting contact is connected is in operation but from which machine there is no product or output.

47. An apparatus of the class described comprising in combination a clock movement, a momentary contact associated with said clock movement for transmitting an impulse at a predetermined period to a printing controlling magnet, which magnet controls the operation of an associated feeding mechanism by a revolving shaft, an auxiliary contact associated with said first-mentioned printing mechanism to transmit or relay the electrical impulse to another printing controlling magnet that is associated with a second printing mechanism similar to the first-mentioned printing mechanism, there being a series of associated printing controlling magnets and printing mechanisms, the printing mechanism associated with each printing controlling magnet being constructed so as to print a record upon a strip of paper and so as to move said strip of paper, the construction also being such that only one printing controlling magnet is controlled by said momentary clock contact while there may be any number of printing controlling magnets each of which is under the control of the printing controlling magnet associated with a preceding printing mechanism, the electric impulse being transmitted by the momentary clock contact to the magnet associated with the clock and thereafter being relayed to each successive magnet by the auxiliary contact associated with the mechanical movement last operated, whereby in this manner only one magnet is energized and consequently only the printing mechanism controlled thereby is operated and whereby the power required to operate the printing mechanism need be only powerful enough to actuate one.

48. An apparatus for counting the output of a machine which apparatus comprises a transmitting switch operating in unison with a moving operating element of the machine and an output switch dependent for its closing upon an output being delivered from the machine, the construction being such that no count from the machine can be made until both of said switches are in closed position.

This specification signed and witnessed this 15th day of May, A. D. 1917.

WILLIAM S. NORTON.

Signed in the presence of—
EDWIN A. PACKARD,
G. McGRANN.